US012429492B2

(12) United States Patent
Kraetschmer

(10) Patent No.: US 12,429,492 B2
(45) Date of Patent: Sep. 30, 2025

(54) APPARATUS FOR REMOVING A CAP CLOSING A LABORATORY SAMPLE CONTAINER AND LABORATORY AUTOMATION SYSTEM

(71) Applicant: Roche Diagnostics Operations, Inc., Indianapolis, IN (US)

(72) Inventor: Marius Kraetschmer, Kirdhheim unter Teck (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 818 days.

(21) Appl. No.: 17/652,569

(22) Filed: Feb. 25, 2022

(65) Prior Publication Data

US 2022/0299538 A1 Sep. 22, 2022

(51) Int. Cl.
*G01N 35/04* (2006.01)

(52) U.S. Cl.
CPC ..... *G01N 35/04* (2013.01); *G01N 2035/0405* (2013.01)

(58) Field of Classification Search
CPC . G01N 35/04; G01N 2035/0405; B67B 7/182
See application file for complete search history.

(56) References Cited

U.S. PATENT DOCUMENTS

| 6,202,278 B1* | 3/2001 | Nakayama | G01N 35/026 29/426.3 |
|---|---|---|---|
| 2003/0103839 A1* | 6/2003 | Osborne | B67B 7/164 414/411 |
| 2010/0043211 A1* | 2/2010 | Pedrazzini | G01N 35/0099 29/700 |
| 2016/0238627 A1* | 8/2016 | Raicu | G01N 35/026 |
| 2018/0161567 A1* | 6/2018 | Fox | A61M 39/162 |

FOREIGN PATENT DOCUMENTS

| EP | 3236267 A1 | 10/2017 |
|---|---|---|
| JP | H11-230967 A | 8/1999 |

OTHER PUBLICATIONS

European Search Report issued Aug. 16, 2021, in Application No. 21162923.3, 2 pp.

* cited by examiner

*Primary Examiner* — Jennifer Wecker
*Assistant Examiner* — Britney N. Washington
(74) *Attorney, Agent, or Firm* — Thomas E. Lees, LLC

(57) ABSTRACT

Apparatus for removing a cap closing a laboratory sample container, the apparatus comprising a cap gripper being adapted to grip a cap to be removed and being adapted to remove the cap being gripped from the laboratory sample container, a displaceable chute comprising a cap inlet, a linear guide defining a linear trajectory, wherein the displaceable chute is mechanically coupled to the linear guide such that the displaceable chute is displaceable along the linear trajectory, and a drive being adapted to cause a displacement of the displaceable chute along the linear trajectory to a dropping position, wherein in the dropping position the removed cap being gripped by the cap gripper is at least partially inserted into the cap inlet of the displaceable chute.

9 Claims, 3 Drawing Sheets

APPARATUS FOR REMOVING A CAP CLOSING A LABORATORY SAMPLE CONTAINER AND LABORATORY AUTOMATION SYSTEM

CROSS-REFERENCE TO RELATED APPLICATIONS

This application claims priority to European Patent Application No. 21162923.3, filed 16 Mar. 2021, the disclosure of which is hereby incorporated by reference in its entirety.

SUMMARY

Although the embodiments of the present disclosure are not limited to specific advantages or functionality, the present disclosure provides for an apparatus for removing a cap closing a laboratory sample container, and a laboratory automation system comprising the apparatus enabling a reliable operation.

In accordance with one embodiment of the present disclosure, an apparatus for removing a cap closing a laboratory sample container is provided, the apparatus comprising: a cap gripper being adapted to grip a cap to be removed and being adapted to remove the cap being gripped from the laboratory sample container, a displaceable chute comprising a cap inlet, a linear guide defining a linear trajectory, wherein the displaceable chute is mechanically coupled to the linear guide such that the displaceable chute is displaceable along the linear trajectory, and a drive being adapted to cause a displacement of the displaceable chute along the linear trajectory to a dropping position, wherein in the dropping position the removed cap being gripped by the cap gripper is at least partially inserted into the cap inlet of the displaceable chute.

In accordance with another embodiment of the present disclosure, a laboratory automation system for automatically processing samples contained in laboratory sample containers is provided, wherein the laboratory sample containers are closed by caps when provided to the laboratory automation system, wherein the laboratory automation system comprises: an apparatus according to an embodiment of the present disclosure, and at least one laboratory station being adapted to automatically process the samples.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
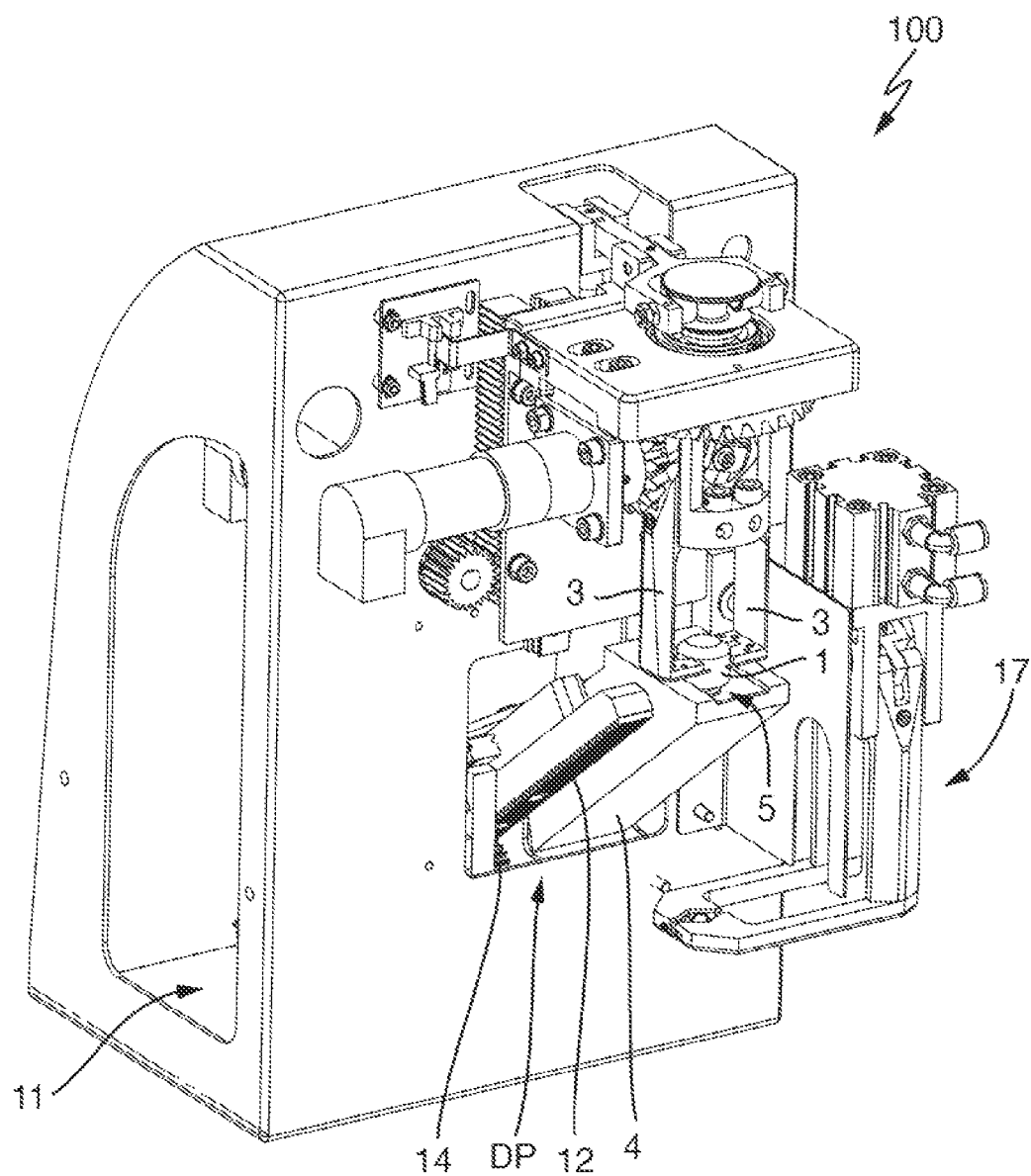
FIG. 1 shows a perspective view of an apparatus for removing a cap closing a laboratory sample container in accordance with an embodiment of the present disclosure.
Figure 1:
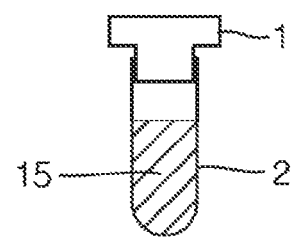

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

The apparatus is adapted to remove a cap closing a laboratory sample container. The laboratory sample container typically contains a liquid sample, e.g., a blood sample, etc.

The apparatus comprises a cap gripper being adapted to grip a cap to be removed and being adapted to remove the cap being gripped from the laboratory sample container. To remove the cap, the cap gripper may apply any suitable force to the gripped cap while the laboratory sample container is fixed. The cap gripper may apply a rotational force and/or a transversal force to the cap for a removal of the cap. The laboratory sample container is typically embodied as a laboratory sample tube having a circular cross section. The cap typically comprises a cap head and a cap body, wherein the cap head has a larger diameter than the cap body. The cap head typically has a diameter larger than the diameter of the laboratory sample container and the cap body has a diameter corresponding to the diameter of the laboratory sample container. Typically, the cap body is inserted into the laboratory sample container and the cap head is gripped by the cap gripper to remove the cap body out of the laboratory sample container.

The apparatus further comprises a displaceable chute comprising a cap inlet. The cap inlet is adapted to receive a removed cap.

The apparatus further comprises a linear guide defining a, in particular strictly, linear trajectory, wherein the displaceable chute is mechanically coupled to the linear guide such that the displaceable chute is displaceable or displaced, in particular only, along the linear trajectory.

The apparatus further comprises a drive being adapted to cause a displacement of the displaceable chute along the linear trajectory to a dropping position. In the dropping position of the displaceable chute the removed cap still being gripped by the cap gripper is at least partially inserted into the cap inlet of the displaceable chute. When the cap is released by the cap gripper, the released cap drops through the cap inlet into the chute and is then guided towards a cap tray.

According to an embodiment the linear trajectory forms an angle with respect to a horizontal plane in a range between 38 angular degrees and 42 angular degrees. In particular, the angle is exactly 40 angular degrees. This angle was determined by means of a space investigation to ensure that the gripped caps do not collide with the chute.

According to an embodiment the drive is adapted to cause a displacement of the displaceable chute along the linear trajectory between the dropping position and an idle position, wherein in the idle position the displaceable chute does not restrict a rotational and/or linear movement of the cap gripper.

According to an embodiment the cap inlet is formed by an opening in an upper flat plate of the displaceable chute, the upper plate extending horizontally in an operating orientation of the displaceable chute.

According to an embodiment the displaceable chute comprises a, in particular closed, pipe, wherein the upper plate is arranged at an upper end of the pipe.

According to an embodiment the apparatus comprises a cap tray, wherein the displaceable chute, in particular the pipe, comprises a cap outlet, the displaceable chute or pipe guiding a removed cap being released by the cap gripper from/through the cap inlet along the pipe towards the cap outlet and into the cap tray.

According to an embodiment, the drive comprises a tooth bar mounted in/at the linear guide, wherein the displaceable chute is mechanically fixed to the tooth bar.

According to an embodiment the drive comprises an electric motor and a gear wheel engaging the tooth bar, wherein the gear wheel is driven by the electric motor. The electric motor may be mechanically fixed to a frame of the apparatus, such that the tooth bar and consequently the displaceable chute moves along the linear trajectory relative to the frame when the gear wheel rotates.

The laboratory automation system is adapted to automatically process laboratory samples contained in laboratory sample containers. The samples are typically body fluids, such as blood, urine, etc. The laboratory sample containers are typically closed by caps when provided to the laboratory automation system.

The laboratory automation system comprises an apparatus as described above, and at least one laboratory station functionally coupled to the apparatus and being adapted to automatically process/analyze the samples.

According to an embodiment the at least one laboratory station is a pre-analytical station, an analytical station, or a post-analytical station.

Pre-analytical stations may be adapted to perform any kind of pre-processing of samples, sample containers and/or sample container carriers.

Analytical stations may be adapted to use a sample or part of the sample and a reagent to generate a measuring signal, the measuring signal indicating if and in which concentration, if any, an analyte is existing.

Post-analytical stations may be adapted to perform any kind of post-processing of samples, sample containers and/or sample container carriers.

The pre-analytical, analytical and/or post-analytical stations may comprise at least one of a recapping station, an aliquot station, a centrifugation station, an archiving station, a pipetting station, a sorting station, a tube type identification station, a sample quality determining station, an add-on buffer station, a liquid level detection station, and a sealing/desealing station.

In order that the embodiments of the present disclosure may be more readily understood, reference is made to the following examples, which are intended to illustrate the disclosure, but not limit the scope thereof.

Figure 4:
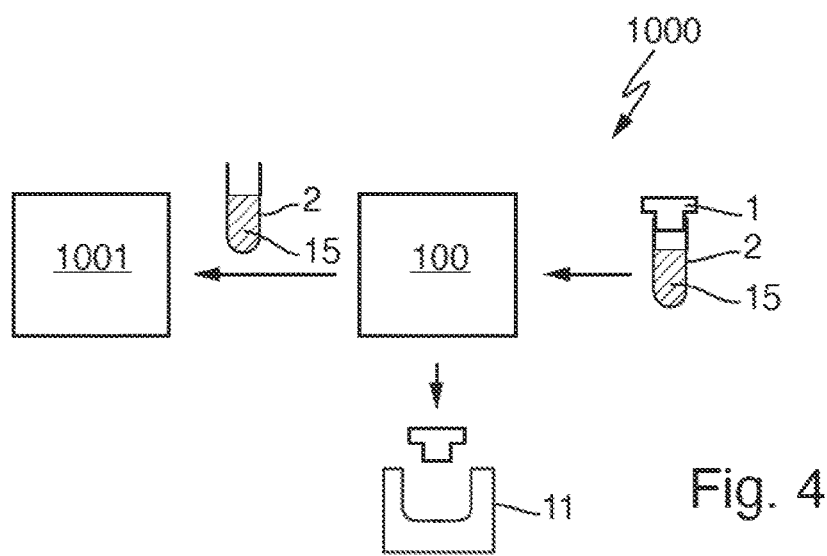
FIG. 4 shows a highly schematic block diagram of a laboratory automation system in accordance with an embodiment of the present disclosure comprising the apparatus for removing the cap closing the laboratory sample container displayed in FIGS. 1 and 2.

FIG. 4 shows a highly schematic block diagram of a laboratory automation system 1000 for automatically processing samples 15 contained in laboratory sample containers 2. The laboratory sample containers 2 are closed by caps 1 when provided to the laboratory automation system 1000.

The laboratory automation system 1000 comprises an apparatus 100 for removing the cap 1 closing the laboratory sample container 2 and a laboratory station 1001 being adapted to automatically process the samples 15 contained in the laboratory sample container 2. The cap 1 is removed from the laboratory sample container 2 and is then put into a cap tray 11, wherein the sample container 2 without the cap 1 is transported to the laboratory station 1001 for further processing.

FIG. 1 shows a perspective view on the apparatus 100 for removing the cap 1 closing the laboratory sample container 2 in a dropping position DP.

The apparatus 100 comprises a cap gripper 3 being adapted to grip the cap 1 to be removed and being adapted to remove the cap 1 being gripped from the laboratory sample container 2. The cap gripper 3 may be adapted to rotate the gripped cap 1 around a vertical axis and may further be adapted to vertically move the gripped cap 1 while the laboratory sample container 2 is fixed in its position by means of a laboratory sample container gripping/handling device 17. As depicted, the laboratory sample container 2 is no longer gripped by the laboratory sample container gripping/handling device 17, i.e., the cap 1 has already been successfully removed from the laboratory sample container 2.

Figure 3:
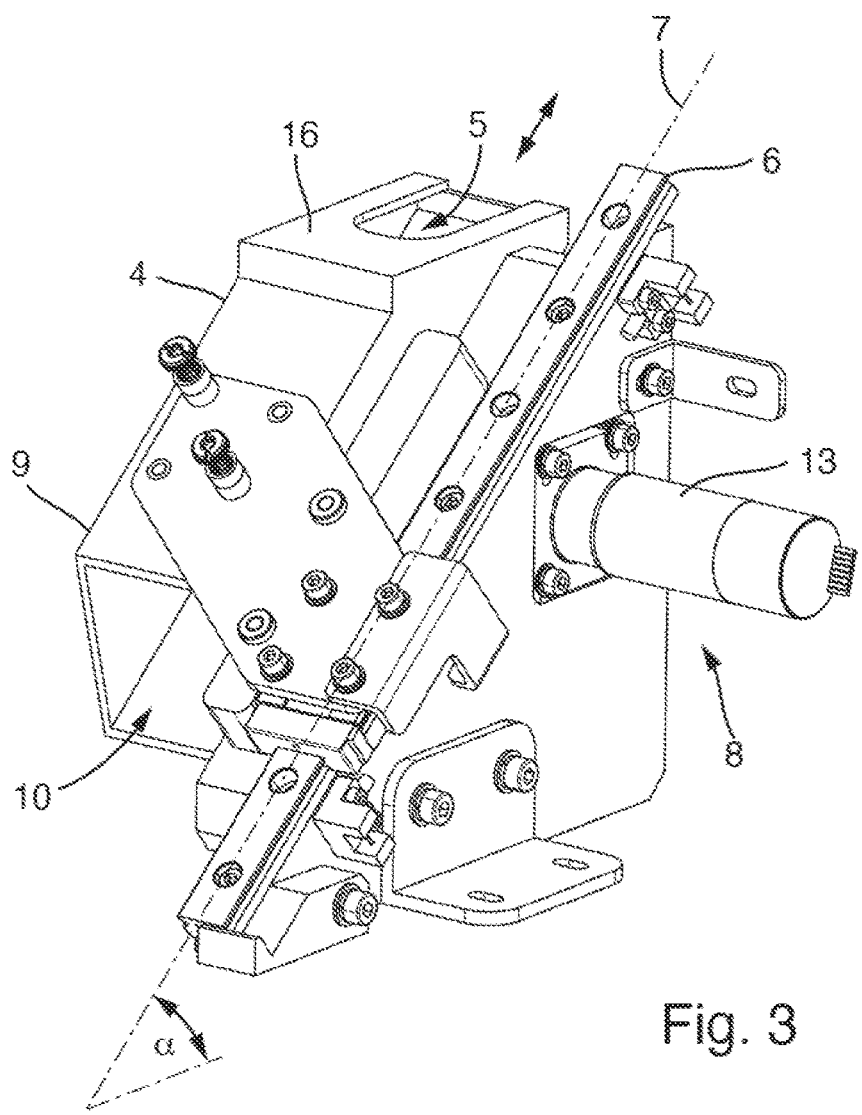
FIG. 3 shows a perspective view of a displaceable chute and a corresponding drive of the apparatus for removing the cap closing the laboratory sample container displayed in FIGS. 1 and 2.

The apparatus 100 further comprises a displaceable chute 4 comprising a cap inlet 5 and a linear guide 6 defining a linear trajectory 7, see FIG. 3, wherein the displaceable chute 4 is mechanically coupled to the linear guide 6 such that the displaceable chute 4 is displaceable only along the linear trajectory 7. In other words, a rotation of the displaceable chute 4 is prevented by the linear guide 6.

The apparatus 100 further comprises a drive 8 being adapted to cause a displacement of the displaceable chute 4 along the linear trajectory 7 to the dropping position DP, wherein in the dropping position DP the removed cap 1 being gripped by the cap gripper 3 is partially or fully inserted into the cap inlet 5 of the displaceable chute 4, see FIG. 1.

Referring to FIG. 3, the linear trajectory 7 forms an angle α of 40 angular degrees with respect to a horizontal plane.

Figure 2:
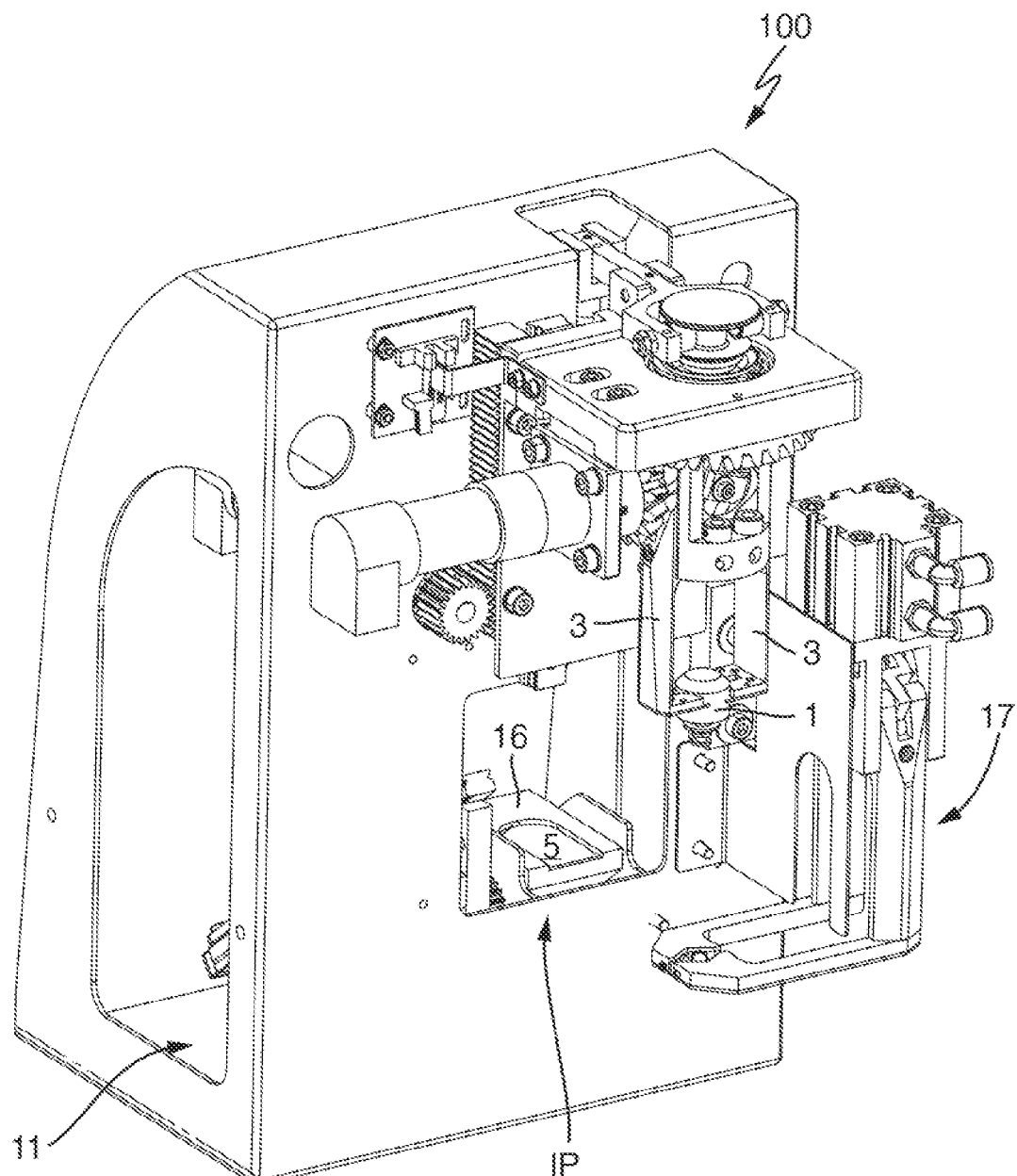
FIG. 2 shows another perspective view of the apparatus for removing the cap closing the laboratory sample container from a different perspective.

The drive 8 is adapted to cause a displacement of the displaceable chute 4 along the linear trajectory 7 between the dropping position DP and an idle position IP, see FIG. 2, wherein in the idle position IP the displaceable chute 4 does not restrict any movement of the cap gripper 3.

E.g., referring to FIG. 3, the cap inlet 5 is formed by an opening in an upper plate 16 of the displaceable chute 4. The upper plate 16 extends horizontally in an operating orientation of the displaceable chute 4.

The displaceable chute 4 comprises a closed pipe 9, wherein the upper plate 16 is arranged at an upper end of the pipe 9.

The apparatus 100 comprises a cap tray 11, wherein the displaceable chute 4 comprises a cap outlet 10, the pipe 9 guiding a removed cap 1 being released by the cap gripper 3 from the cap inlet 5 along the pipe 9 towards the cap outlet 10 and into the cap tray 11.

The drive 8 comprises a tooth bar 12 mounted in/at the linear guide 6, wherein the displaceable chute 4 is mechanically fixed to the tooth bar 12. The drive 8 comprises an electric motor 13 and a gear wheel 14 engaging the tooth bar 12, wherein the gear wheel 14 is driven by the electric motor 13 to cause a linear movement of the displaceable chute 4 along the linear trajectory 7.

The present disclosure solves problems during the decapping process, in particular related to sticky rubber caps 1 and caps 1 not being correctly guided to the cap tray 11. Further spilling and contamination of the laboratory automation system 1000 can be prevented. The cap 1 being at least partially inserted into the cap inlet 5 prevents the loss of the cap 1, as the cap is completely enclosed by the displaceable chute 4. In addition, the risk of splashing is significantly reduced. While opening the cap gripper 3, the caps 1 are stripped off towards the pipe 9 and cannot stick to the gripper fingers of the cap gripper 3.

What is claimed is:

1. An apparatus for removing a cap closing a laboratory sample container, the apparatus comprising:
    a cap gripper being adapted to grip a cap to be removed and being adapted to remove the cap being gripped from the laboratory sample container,
    a displaceable chute comprising a cap inlet,
    a linear guide defining a linear trajectory that forms an angle (a) with respect to a horizontal plane in a range between 38 angular degrees and 42 angular degrees, wherein the displaceable chute is configured to be mechanically coupled to the linear guide such that the displaceable chute is configured to be displaceable along the linear trajectory, and
    a drive being adapted to cause a displacement of the displaceable chute along the linear trajectory to a dropping position, wherein in the dropping position the removed cap being gripped by the cap gripper is at least partially inserted into the cap inlet of the displaceable chute.

2. The apparatus according to claim 1, characterized in that the drive is adapted to cause a displacement of the displaceable chute along the linear trajectory between the dropping position and an idle position, wherein in the idle position the displaceable chute does not restrict a movement of the cap gripper.

3. The apparatus according to claim 1, characterized in that the cap inlet is formed by an opening in an upper plate of the displaceable chute, the upper plate extending horizontally in an operating orientation of the displaceable chute.

4. The apparatus according to claim 3, characterized in that the displaceable chute comprises a pipe, wherein the upper plate is arranged at an upper end of the pipe.

5. The apparatus according to claim 4, characterized in that the apparatus comprises a cap tray, and wherein the displaceable chute comprises a cap outlet, the displaceable chute guiding a removed cap being released by the cap gripper from the cap inlet along the pipe towards the cap outlet into the cap tray.

6. The apparatus according to claim 1, characterized in that the drive comprises a tooth bar mounted in the linear guide, wherein the displaceable chute is mechanically fixed to the tooth bar.

7. The apparatus according to claim 6, characterized in that the drive comprises an electric motor and a gear wheel engaging the tooth bar, wherein the gear wheel is driven by the electric motor.

8. A laboratory automation system for automatically processing samples contained in laboratory sample containers, wherein the laboratory sample containers are closed by caps when provided to the laboratory automation system, wherein the laboratory automation system comprises:
    an apparatus according to claim 1, and
    at least one laboratory station being adapted to automatically process the samples.

9. The laboratory automation system according to claim 8, characterized in that the at least one laboratory station is a pre-analytical station, an analytical station, or a post-analytical station.

* * * * *